United States Patent [19]

Ellmers

[11] 4,148,337

[45] Apr. 10, 1979

[54] FREE DELIVERY RETURN VALVE AND ASSOCIATED SYSTEM

[75] Inventor: Charles R. Ellmers, South Euclid, Ohio

[73] Assignee: Fluid Controls, Inc., Mentor, Ohio

[21] Appl. No.: 766,702

[22] Filed: Feb. 8, 1977

[51] Int. Cl.[2] .............................................. G05D 7/01

[52] U.S. Cl. ...................................... 137/493; 60/695; 137/513.5; 137/560; 181/237; 251/281; 251/368

[58] Field of Search ...................... 137/493, 513.5, 560, 137/513.3; 60/695; 181/230, 237; 251/281, 368

[56] References Cited

U.S. PATENT DOCUMENTS

| | | | |
|---|---|---|---|
| 353,062 | 11/1886 | Hill | 181/237 |
| 2,761,737 | 9/1956 | Nurkiewicz | 251/368 X |
| 3,093,359 | 6/1963 | DeWoody | 251/368 X |
| 3,223,111 | 12/1965 | Anderson | 251/368 |
| 3,421,545 | 1/1969 | DeMarco | 137/513.3 |
| 3,433,253 | 3/1969 | Tomer | 137/493 |
| 3,589,677 | 6/1971 | Segers | 251/368 |
| 3,665,965 | 5/1972 | Baumann | 138/42 |

*Primary Examiner*—Robert G. Nilson
*Attorney, Agent, or Firm*—Watts, Hoffmann, Fisher & Heinke, Co.

[57] ABSTRACT

A free delivery controlled return valve, of the type employed in fluid power hoisting apparatus, which controls the speed at which a load is lowered as a function of load magnitude. An improved valve structure is disclosed which overcomes false load signals, such as those generated when the hoisting apparatus' lift cylinders are fully extended against a stop, and which thus permits the load platform to descend at an appropriate speed. An improved fluid sonic muffler is also disclosed.

20 Claims, 13 Drawing Figures

FREE DELIVERY RETURN VALVE AND ASSOCIATED SYSTEM

BACKGROUND OF THE INVENTION

This invention relates to a free delivery, controlled return valve employed in a fluid power hoist system to control the velocity at which a load supporting platform is lowered by the system as a function of the magnitude of the load. More particularly, this invention relates to an improved valve which overcomes a false signal indicating the presence of a load on the platform when there is none. Additionally, this invention relates to a fluid control valve which minimizes the generation of noise in the associated fluid circuitry.

DESCRIPTION OF THE PRIOR ART

Hydraulic lifting apparatus used in industrial lift trucks include one or more hydraulic cylinders for supporting and alternatively raising or lowering lift forks or other load supporting platform structures. Each cylinder housing includes a piston mounted for reciprocal movement between stops in response to hydraulic fluid alternatively supplied to or withdrawn from the cylinder. The rates of raising and lowering the platform structure are a function of the rates at which hydraulic fluid is supplied to or withdrawn from the cylinders. Preferably, such lift trucks should lift and lower loads at the highest speeds consistent with safety. No serious problem is presented in lifting and lowering light loads. Rapid lowering of heavy loads, approaching the capacity of the lift truck, may cause the lift truck to tip.

To assure optimum efficiency consistent with safe operation the hydraulic circuits of lift trucks have been provided with free delivery, controlled return valves such as those described in U.S. Pat. Nos. 3,414,007; 3,421,545; and 3,433,253. These valves control hydraulic fluid flow between a hydraulic circuit's reservoir and lift cylinders. When it is desired to extend the cylinders and raise a load, relatively unrestricted fluid flow is permitted from the reservoir to the cylinders. These valves are advantageously utilized because they sense the fluid pressure, a function of load magnitude, prior to lowering and respond at the inception of platform lowering to smoothly control the speed of lowering accordingly. Thus, when it is desired to retract the cylinders and lower a load, return fluid flow from the cylinders to the reservoir is automatically restricted and directly related to the magnitude of the load.

The valve disclosed in U.S. Pat. No. 3,433,253 comprises a valve housing defining a fluid flow path between a pair of fluid ports, one of which is connected with the lift cylinders and the other of which is connected with the fluid reservoir. A valve seat in the housing includes a valve orifice along the fluid flow path. A flapper type valve element is supported by an axially movable rotatable pressure sensing device disposed intermediate the valve seat and the port connected to the lift cylinders. The valve element is pivotally movable into or out of abutting relation with the valve seat and is laterally displaceable with respect to the valve orifice.

In the operation of a hydraulic lifting apparatus employing this valve, raising of a platform structure is effected by directing fluid to the lift cylinders from the reservoir. Fluid flowing in this direction pivots the valve element out of an abutting relationship with the valve seat and flows freely to the lift cylinders. When platform elevation is stopped the valve element is biased back into engagement with the valve seat.

The pressure sensing device responds to sensed fluid pressure to displace the valve element laterally of the valve orifice over a range of return flow restricting positions. The pressure sensing device responds to increasing pressure to displace the valve element toward its most restrictive position while a biasing spring resists this movement and tends to urge the valve element toward its least restrictive position.

When the platform is lowered, the direction of fluid flow is reversed and the return fluid flow produces an additional force urging the valve element into firm abutting contact with the valve seat. With the prior valve the forces applied to the valve element tended to maintain it in the laterally displaced position it had assumed prior to the commencement of platform lowering. Thus, the valve orifice is restricted to a flow area consistent with the pressure sensed before return flow and platform lowering were initiated. The rate of return flow and the rate of platform descent are rates which are safe for the load being transported.

While the described valve performs its function exceedingly well, at least one situation arises in which it interferes with the desired platform lowering rate. When the platform elevating cylinders are fully extended, their pistons stops are abutted and high fluid pressure will be generated in the hydraulic cylinders and associated hydraulic circuitry if pressure application is continued. The pressure sensing device responds to this high pressure by displacing the pivoted valve element laterally of the valve seat toward or to its restrictive position with respect to the valve seat orifice. In this condition the sensing device responds as if the platform is heavily loaded when in fact the platform may be empty. When the valve element is in its most restrictive position it restricts the return flow of fluid to the greatest degree possible. Under these circumstances the frictional resistance between the seated valve element and the seat is sufficiently great to prevent element movement. That is, the spring which opposes the pressure sensing device cannot exert enough force to overcome this friction between the valve element and seat to displace the element.

There is a difficulty which can arise in conjunction with the lowering of heavy loads in hydraulic lifting apparatus such as those described above. This problem involves the generation of hydraulic noise. Hydraulic noise is particularly objectionable when it occurs in electric-powered lift trucks which are otherwise notable for their quiet operation. When a heavy load is supported on an electric-powered lift truck's load supporting platform prior to lowering, that load generates a high pressure in the hydraulic fluid. When the load begins to descend, the high pressure fluid being exhausted from the lift cylinders passes through the restricted orifice in the form of a high speed, low volume jet. The velocity of the fluid jet can reach 200 miles per hour. This high speed jet is directed more or less straight downstream into the hydraulic circuitry where it creates extreme turbulence and cavitation generating noise for a considerable length of this circuitry.

SUMMARY OF THE INVENTION

The present invention overcomes problems of the prior art and provides means by which the control valve responds automatically to overcome false load signals.

In a valve made in accordance with this invention, a control valve is provided which is similar to the valve which has been described and is more fully described in U.S. Pat. No. 3,433,253. The valve of this invention differs from the prior art in that the valve element and seat have been modified to maintain the effective flow area through the orifice and past the valve element while reducing the fluid pressure differential on the valve element and the frictional resistance between them.

The modified valve seat and element of this invention provide a fluid distribution means. This fluid distribution means reduces the fluid pressure differential on the valve element during platform lowering.

In its preferred form the fluid distribution means comprises fluid carrying grooves. The valve element is provided with a plurality of these grooves which are communicable with the fluid flow path to reduce the pressure differential on the element and therefore the focus bringing contactable surfaces of the valve seat and valve element together.

In a further aspect of this invention an anti-friction coating is applied between the valve seat and element, in addition to the fluid distribution means, to reduce friction between the contactable surfaces of the seat and element.

In a further aspect of this invention, a sonic muffler is provided for reducing hydraulic noise generated by a high velocity jet in a hydraulic circuit.

Accordingly the objects of this invention are to provide a novel and improved hydraulic device preferrably including both an improved valve and an improved muffler and methods of controlling hydraulic flow.

DESCRIPTION OF A PREFERRED EMBODIMENT

Figure 1:
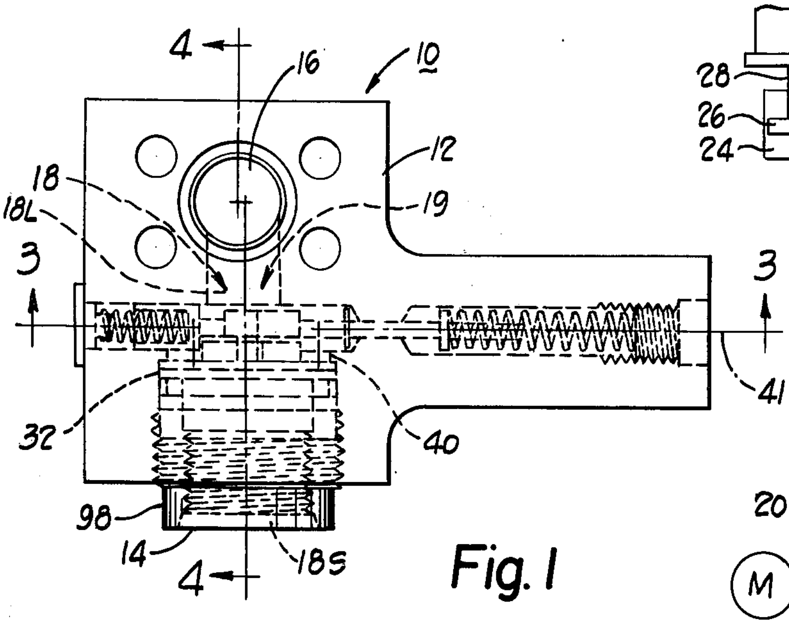
FIG. 1 is a plan view of the valve of the present invention.
Figure 2:
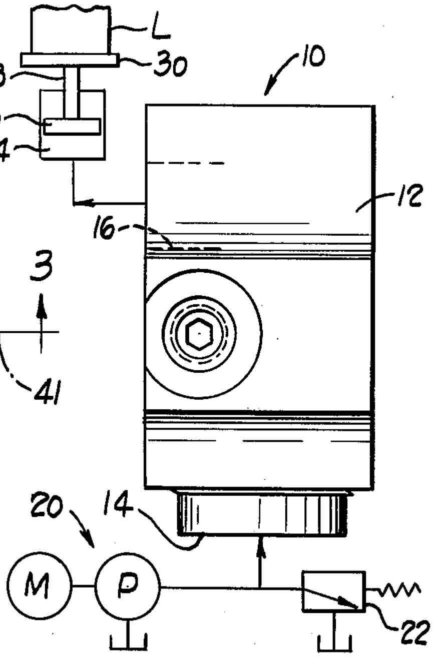
FIG. 2 is an end elevation view of the valve shown in FIG. 1 and showing diagrammatically its connection in a hydraulic hoist circuit.

A free-delivery controlled return valve 10, generally of the type illustrated in U.S. Pat. No. 3,433,253, which incorporates features of this invention is illustrated in FIG. 2 schematically connected in a hydraulic hoist system employed in a hydraulic lift vehicle. The valve 10 generally includes a housing 12 having spaced supply and load fluid ports 14, 16 connected by a fluid flow path 18 defined within the housing. A flow control mechanism, indicated generally at 19, is disposed in the housing 12 to permit relatively unrestricted fluid flow from a supply portion 18S to a load portion 18L of the fluid flow path 18 and to control the rate of fluid flow in the opposite direction along the path.

The valve 10 is interposed in the illustrated hydraulic system, between a motor driven pump and reservoir 20 and a hydraulic lift cylinder 24. The valve's supply fluid port 14 is connected to the pump and reservoir 20 while the load fluid port 16 is connected to a hydraulic lift cylinder 24.

The pump and reservoir 20 provide a source of pressurized fluid for the hydraulic system. A pressure relief valve 22 is connected to the pump and reservoir 20 to relieve excess fluid pressure in the system.

The hydraulic lift cylinder 24 contains a piston 26 which is disposed for reciprocation within the cylinder 24. The piston 26 supports a piston rod 28 which extends from the cylinder 24 and is attached to a lifting structure 30. The structure 30 is intended to support a load L. When pressurized fluid is supplied to the cylinder 24, the piston 26 and piston rod 28 are extended with respect to the cylinder and the lifting structure 30 is raised. Similarly, when pressurized fluid is removed from the cylinder, the piston 24 and piston rod 26 are retracted, thus effecting a lowering of the lifting structure 30. The rates of raising and lowering of the lifting structure 30 are functions of the rate at which pressurized fluid is delivered to, or removed from, the cylinder 24.

Figure 3:
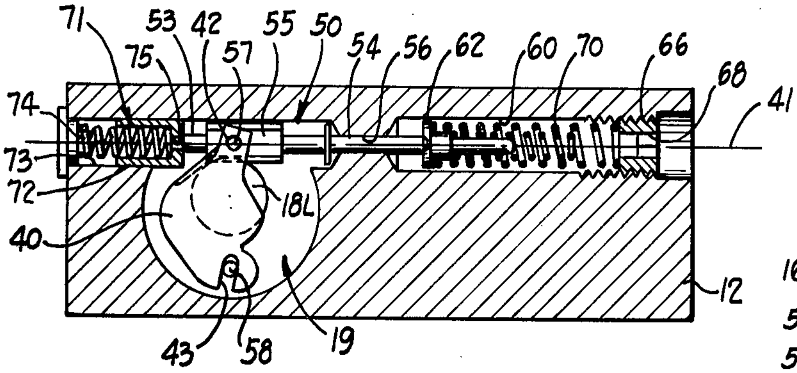
FIG. 3 is a cross-sectional view as seen from the plan indicated by the line 3—3 in FIG. 1.
Figure 4:
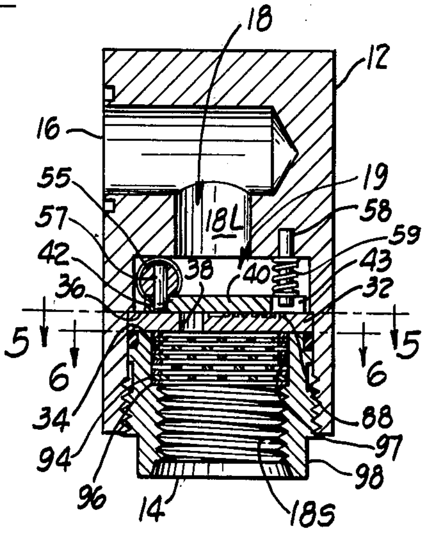
FIG. 4 is a vertical cross-sectional view as seen from the plane indicated by the line 4—4 in FIG. 1.
Figure 5:
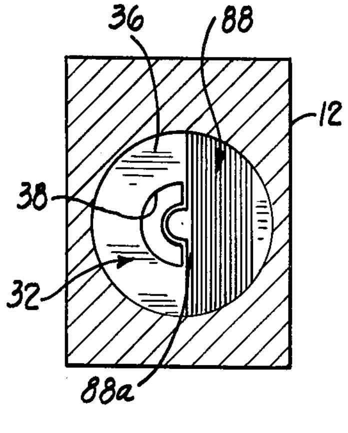
FIGS. 5 and 6 are sectional views as seen from the planes indicated by lines 5—5 and 6—6 respectively in FIG. 4.

Referring to FIG. 4, the flow control mechanism 19 includes a valve seat 32 disposed in flow restricting relation with respect to the fluid flow path 18. This valve seat 32 has spaced supply and load side surfaces 34, 36. These surfaces 34, 36 are connected by other surfaces which define an orifice 38 along the flow path. The orifice 38, which enables pressurized fluid to flow through the valve seat 32, is a semi-annular passage and is most clearly shown in FIG. 5. The flow control mechanism 19 further comprises a flapper type valve element 40, clearly shown in FIG. 3. The valve element 40 is disposed adjacent to the load side seat surface 36 for regulating fluid flow through the orifice 38. The valve element 40 is mounted for pivotal movement away from the seat surface 36 in response to load elevating fluid flow.

Referring to FIGS. 3 and 4, the flow control mechanism 19 also includes a pressure sensing device or piston 50 for sensing fluid pressure in the load portion 18L of the flow path 18. This device 50 is the same as the pressure sensing device of U.S. Pat. No. 3,433,523 where it is described more completely. The pressure sensing device 50, which is mounted for rotation as well as axial movement along a transverse axis 41, supports the valve element 40 for movement. The rotatability of device 50 enables pivoting movement of the valve element 40 with respect to the valve seat 32 in response to fluid flow. The element 40 is moved between a seated orientation wherein it abuts the valve seat 32 and an unseated orientation (not illustrated) wherein it is displaced or removed from the valve seat.

The pressure sensing device 50 includes an enlarged element support portion 55 and a pair of cylindrical rod end portions 53, 54 which extend axially from opposite ends of the enlarged portion 55.

The support portion 55 mounts the valve element 40 by means of a pin 57 which extends transversely of the piston's longitudinal axis. An aperture 42 is provided near one end of the valve element 40 for receiving the pin 57.

The valve element 40 is provided with a slot 43 opposite its aperture 42. The slot 43 is intended to receive a pin 58 which extends from the interior of the housing 12. A seating spring 59 is mounted in surrounding relation to the pin 58 and bears against one surface of the valve element 40 to urge the element 40 into a seated position against the valve seat 32.

The cylindrical rod end portion 53 extends axially from one end of the support portion 55 toward a damping device 71. The damping device 71 is provided to damp leftward motion of the pressure sensing device 50, as seen in FIG. 3, and to slow the unblocking movement by the valve element 40 of the orifice 38 in response to transient decreases in pressure. The damping device smoothens changes in the rate of flow through the orifice and therefore smoothens descent of the platform structure 30.

The damping device 77 comprises a hollow piston 72 which is slidably mounted in a chamber 73 for limited corresponding movement with the pressure sensing device 50. The piston 72 is biased toward the sensing device 50 by a spring 74. The piston 72 moves with the sensing device 50 but only to the extent of movement of the spring 74.

A port 75, provided in the end face of the piston 72 in coaxial alignment with the rod end portion 53, provides fluid communication between the hollow interior of the damping piston 72 and the load portion 18L of the fluid flow path so that fluid in the interior of the piston 72 is at substantially the same pressure as fluid in the flow path portion 18L.

The cylindrical rod end portion 54 extends through a mating cylindrical bore 56 into an elongate chamber 60. An abutment plate 62 is disposed in the chamber 60 and mounted on the end portion 54 for axial movement. An open end of the chamber 60 remote from the bore 56 is threaded to receive a plug 66 having a vent 68. The chamber interior communicates with the ambient atmosphere through the vent 68.

One or more helical springs 70 are disposed within the chamber 60 between the plug 66 and the abutment member 62. The springs 70, acting against the abutment member 62, urge the valve element 40 leftward (as shown in FIG. 3) toward a least restrictive position with respect to the orifice 38 (See FIG. 9A).

When the pressure sensing device 50 is in its normal position as shown in FIG. 3, a rod end portion 53 abuts the damping piston 72. This abutment both blocks off the port 75 and seals the left-hand end of the rod portion 53 from fluid communication with the flow path load portion 18L. In this normal position, axial forces on the load-sensing device 50 and the damping piston 72 are in equilibrium.

An increase in pressure in the load portion 18L, due for example to a load on the lifting structure 30, will upset the equilibrium of the normal position and shift the damping piston. The piston shifts because hydraulic fluid trapped behind it will momentarily be at a pressure lower than fluid pressure in the load portion 18L and the trapped fluid is able to leak out around the loosely fitting piston. This upsetting of the equilibrium will separate the rod portion 53 and the damping piston 72 enough to allow fluid to come between the two.

Once separated from the piston 72, the rod portion 53 becomes a piston and the pressure sensing mechanism 50 has a pressure differential imposed in it. There is a pressure differential because the total area of the sensing device 50 exposed to fluid pressure in the flow portion 18L and tending to shift it to the right, as seen in FIG. 3, exceeds the total area of surfaces tending to shift it to the left. This pressure differential shifts the pressure sensing device axially to the right as seen in FIG. 3 against the action of the springs 70. This device shifting moves the connected pin 57 and the valve element 40 to a more restrictive load control position. Once the pressure sensing device and rod are separated, fluid is able to flow freely through the port 75 and the damping piston is moved to the right, as seen in FIG. 3, by the extension of the spring 74.

When the sensed pressure is reduced, the pressure sensing device 50 shifts leftward as seen in FIG. 3, shifting the rod end portion 53 into a blocking engagement with the port 75 in the damping piston 72. Since that port 75 is blocked, pressurized fluid contained within the piston interior is driven out of that piston 72 and leaked between the piston 72 and its chamber 73 into the flow path portion 18L. Damping is effected by dimensioning the piston 72 with respect to the chamber 73 to control the rate of leakage around the piston's periphery. This leakage continues until equilibrium is again established.

Under normal circumstances, the valve 10 operates similarly to the valve described in U.S. Pat. No. 3,433,253. To raise the load L, supported on the lifting structure 30, fluid is supplied from the pump and reservoir 20 to the supply port 14. The fluid passes through the valve seat orifice 38 shifting the valve element 40 from a normally abutting position so that fluid flows generally freely along the fluid flow path 18 to the load port 16. From the load port 16 the fluid flows to the hydraulic lift cylinder 24 to effect extension of the piston 26 and rod 28.

The pressure sensing device 50 senses the pressure of fluid in the fluid flow path 18. If the fluid pressure is sufficiently great the pressure sensing device 50 moves axially against the opposing action of the springs 70. The valve element 40 is displaced along axis 41 into a more restrictive relationship with respect to the valve orifice 38.

When the load L is lowered, the direction of fluid flow along the path 18 is reversed as fluid is exhausted from the cylinder 24 through the valve 10 and to the reservoir. When fluid is flowing through the housing 12 from the load port 16 to the supply port 14, the pressure differential of that fluid firmly seats the valve element 40 in abutting relationship against the surface 36 of the valve seat 32. With the prior art valve the fluid force exerted against a seated valve element was sufficiently large that forces on a pressure sensing piston corresponding to the device 50 was not large enough to shift the valve element transversely of its valve seat.

As mentioned previously, the valve 10 receives a false load signal when lifting pressure is applied to the lifting structure 30 after it has been raised to its maximum elevation against a stop. A large hydraulic pressure is generated in the hydraulic circuitry although there may be little or no load on the lifting structure. The sensing device 50 senses this pressure and displaces the valve element 40 to a highly restrictive position with respect to the valve orifice 38. When the platform 30 is lowered from its maximum elevation the pressure differential of the fluid returning from cylinder 24 forces the valve element 40 into a firm abutting position with respect to the valve seat 32. With the prior art valve, the unloaded lifting structure corresponding to lifting structure 30 then descended at a very slow rate because the valve element corresponding to the valve element 40 would not move to a less restrictive position.

With this invention false load signals generated in the valve 10 are automatically overcome so that an empty or nearly empty lifting structure 30 which has been fully extended, may be lowered rapidly, thereby contributing to the overall operating efficiency of the system. Under minimal or no load conditions such means enable the valve element 40, to be displaced laterally to a less restrictive position.

The valve seat orifice 38 has a semi-annular shape which provides the same effective flow area as the prior art circular valve seat orifice (See U.S. Pat. No. 3,433,253). This reduces the overall area of the orifice to reduce the imposition of pressure differential forces on the valve element.

Figure 8A:
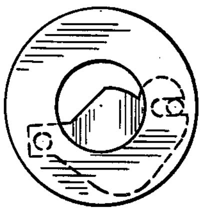
FIGS. 8A–8C illustrate a prior art valve seat with an adjacent valve element disposed in three distinct positions.
Figure 8B:
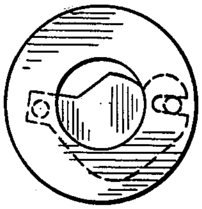
Figure 8C:
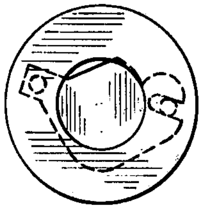
Fig. 8C PRIOR ART

In FIGS. 8A–8C the prior circular shape orifice is illustrated with its associated valve element disposed in three distinct positions ranging from a least restricted position (FIG. 8A) to a most restricted position (FIG. 8C). FIGS. 8A–8C show that irrespective of the orientation of the valve element a substantial portion of the circular orifice of the prior valve seat is always blocked by that valve element.

Figure 9A:
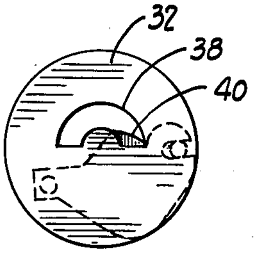
FIGS. 9A–9C illustrate a valve seat embodying an orifice of this invention with an adjacent valve element disposed in three distinct positions which correspond to those of FIGS. 8A–8C.
Figure 9B:
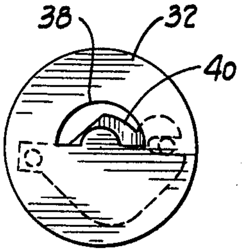
Figure 9C:
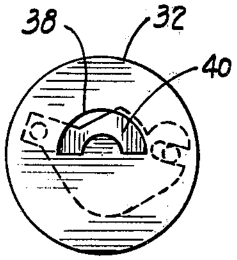

FIGS. 9A–9C are provided to contrast the semi-annular shape orifice 38 of this invention with the prior art circular orifice of FIGS. 8A–8C. In FIGS. 9A–9C the orifice 38 is illustrated with the valve element 40 disposed in three distinct positions, corresponding to those positions of the valve element of FIGS. 8A–8C ranging from a least restricted position (FIG. 9A) to a most restricted position (FIG. 9C). FIGS. 9A–9C clearly illustrate that a reduction of the valve seat orifice size does not reduce the effective flow area of the valve orifice during lowering. By employing the improved valve orifice 38, the surface area of the valve element 40 which is exposed to a pressure differential across the orifice can be substantially reduced, by perhaps as much as 90%, from the exposed surface area of the prior art valve element corresponding to element 38.

In order to maximize the effect of the reduction in the area of the valve seat orifice to substantially reduce the clamping force on the valve element, a large part of the portion of the valve element overlying the seat is desirably subject to substantially equal and opposed fluid pressure forces. A plurality of fluid carrying grooves 88 (See FIG. 5) are provided in the valve seat 32 to achieve the desired pressure equalization. These grooves extend parallel to each other and fully across the face 36 of the valve seat 32, but do not communicate with the orifice 38. These fluid carrying grooves 88 communicate pressurized fluid from the load portion of fluid flow path 18L between the contactable or abuttable portions of the load surface 36 and a surface of the valve element 40. One such groove **88*a* is disposed medially of the valve seat 32 and directly adjacent the orifice 38. This groove includes an enlarged central portion. The positioning of this groove 88*a*** assures that counterbalancing pressurized fluid will reach a region of maximized size between the valve seat and valve element.

The magnitude of the frictional force generated between the abutting surfaces of the valve seat and valve element is a function of the net normal force forcing these surfaces into abutment and the nature of those surfaces. Mathematically speaking the frictional force $Fr = Fn \times f$ where Fn is the net normal force and f is the coefficient of friction of the abutting surfaces. This frictional force Fr is reduced by the grooves 88 because the pressurized fluid which enters the grooves 88 tends to balance the forces exerted on the valve element 40 by the return fluid flow. Consequently the net normal force of the pressurized fluid on the abutting surfaces is reduced from what it would be if these grooves were not provided.

In the preferred valve further improvements over prior art are made to further reduce the frictional force between the valve seat and element. The nature of the abutting surfaces is modified to minimize the coefficient of friction between them.

The coefficient of friction between the valve element and the seat is reduced by coating the contactable surface of one of them with an anti-friction coating of polytetrafluoroethylene, sold under the trademark Teflon. In a preferred embodiment of this invention, the contactable surface of the valve element 40 is coated with Teflon.

The described valve structure improvements reduce the frictional force resulting from returning fluid flow sufficiently so that the compressed spring 70 can move the valve element 40. The improved valve structure will permit the spring 70 to shift the pressure sensing device to some equilibrium position which permits a return rate consistent with the load. The valve element will be displaced with respect to the valve seat almost instantaneously and automatically, without the necessity of manipulating the control valve to stop the descent to eliminate the fluid pressure differential, as was the case with the prior art. Thus, the platform structure which has been fully extended will be lowered at an appropriately fast rate.

Figure 6:
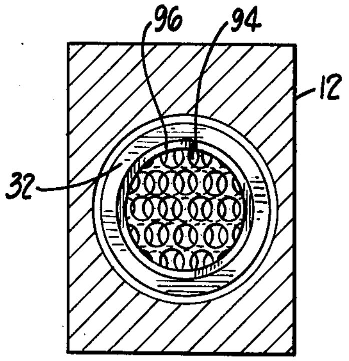
Figure 7:
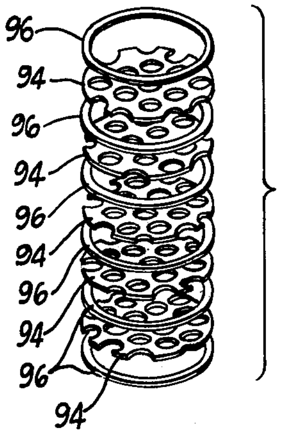
FIG. 7 is an exploded view of the hydraulic muffler of this invention.

In a further aspect of this invention a sonic muffler is provided which is disposed in the supply portion of the flow path 185 immediately adjacent the seat supply surface 34. Referring to FIGS. 4, 6, and 7, the sonic muffler comprises a plurality of perforate sheets 94 which are aligned in parallel relation and are spaced by interposed annular spacers 96. The sheets and spaces are carried in a bore 97 of a tubular nipple 98. The nipple 98 is threaded into the housing 12 and defines the supply portion 18S.

The perforate sheets are stamped elements. The stamping of the sheets distorts them somewhat so that they have a spring like quality. The perforate sheets and annular spacers are clamped together on the supply portion 18S of the fluid flow path between the valve seat surface 34 and a shoulder in the nipple 98. Because of the spring like quality of the perforate sheets, the nipple both abuts the surface 34 to clamp the valve seat 32 in place and clamps the sheets and spaces.

The perforate sheets are oriented with respect to each other so that the apertures of each sheet are randomly oriented with respect to the apertures of each of the adjacent perforate sheets. Consequently, fluid flowing through the sonic muffler 92 will not be able to follow a straight line path to the muffler but will be limited to following a plurality of serpentine paths.

The mechanism by which the sonic muffler works may not be fully understood. It is believed that causing the pressurized fluid flow to be separated into serpentine paths through the muffler reduces the turbulence otherwise present. In addition the pressure drop between the portions 18L and 18S is extended along the flow path and this is believed to contribute to the reduction in pressure differential on the valve element 40.

The preferred muffler structure is a compromise between maximized sound silencing efficiency and flow restriction. By reducing the size of the individual apertures in the apertured plates, even if the percentage of open area is maintained constant, the silencing efficiency of the muffler can be improved. Increasing the number of plates in such a sonic muffler also increased the silencing efficiency of that muffler. Both these techniques are thought to increase sonic efficiency by increasing the serpentine nature of the fluid flow paths through the muffler. It is also recognized that both of these techniques can increase flow restriction to the point where the maximum lowering speed of the lifting platform is unacceptably reduced. Preferably, the sonic muffler should comprise as many layers of perforated sheet having the smallest possible holes that would be acceptable in light of the resulting flow restriction.

The preferred muffler forming a part of the valve 10, is shown in FIG. 4. This muffler comprises five 20 gage carbon steel sheets having 5/32" diameter apertures on 3/16" staggered centers with approximately 33 holes per square inch and having an open area of approximately 63%. The annular spacers interposed between the five perforate sheets are approximately 1/32" thick. When these five apertured sheets are assembled with their apertures in random orientation in a valve inlet port, such as port 14, measuring approximately 1" in diameter, the muffler produced is very open to flow (27 p.s.i. pressure drop at 20 gallons per minute in a typical valve) and yet provides little opportunity, for a jet of pressurized fluid to pass directly through the labyrinth or maze formed by the perforate sheets.

Although the invention has been described in its preferred form with a certain degree of particularly, it is understood that the present disclosure of the preferred form has been made only by way of example and that numerous changes in the details and construction and the combination and arrangement of parts may be resorted to and not depart from the spirit and the scope of the invention as herein after claimed.

What is claimed is:

1. A control valve, comprising:

(a) a housing structure having spaced fluid ports and defining a fluid flow path between the ports;

(b) the housing structure including a valve seat disposed between the ports, the seat including surfaces defining an orifice along the path;

(c) a movable valve element positioned adjacent to and abuttable with the valve seat, the valve element being mounted for movement between a first position wherein the orifice is most restricted and a second position wherein the orifice is least restricted;

(d) biasing means urging the valve element toward the second position;

(e) sensing means responsive to fluid pressure for urging the valve element toward the first position, in opposition to the action of the biasing means, to restrict the orifice in response to such fluid pressure;

(f) fluid distribution means coactible with the valve element for minimizing fluid pressure differential on the valve element when pressure along the path on the valve seat side of the element is less than pressure along the path on the other side of the element.

2. The control valve of claim 1 wherein the fluid distribution means comprises a plurality of fluid carrying grooves disposed in at least one of the valve seat and the valve element, the grooves being communicable with the fluid flow path to reduce friction between contactable surfaces of the valve seat and valve element.

3. The valve of claim 1 wherein at least one of the valve seat and the valve element is provided with an anti-friction coating to reduce the friction between contactable surfaces of the valve seat and valve element.

4. The valve of claim 3 wherein said anti-friction coating is polytetrafluoroethylene.

5. The valve of claim 1 and further including a muffler disposed along the fluid flow path for muffling noise generated by pressurized fluid flowing along the path.

6. The valve of claim 5 wherein the muffler includes a plurality of spaced perforate sheets, the apertures of each sheet being randomly oriented with respect to the apertures of each of the adjacent perforate sheets.

7. The valve of claim 6 wherein the spaced perforate sheets are separated by interposed spacers.

8. The valve of claim 5 wherein the muffler is disposed on the opposite side of the valve seat from the valve element and intermediate the valve seat orifice and one of the fluid ports.

9. A control valve, comprising:

(a) a housing structure having first and second fluid ports and defining a fluid flow path between the ports;

(b) the structure including a valve seat disposed between the ports, said seat defining an orifice forming a portion of the path;

(c) a valve element disposed in the fluid flow path adjacent to the valve seat between the valve seat and the second port, the valve element being pivotally mounted for movement between a seated position where the valve element abuts the valve seat and an unseated position, where the valve element is removed from the seat;

(d) first biasing means urging the valve element toward the seated position, the valve element being urged toward the unseated position against the action of the first biasing means in response to fluid flow from the first port to the second port;

(e) the valve element also being mounted for movement along an axis transverse to the valve seat, second biasing means urging the valve element along the transverse axis toward a position wherein said orifice is minimally restricted by the valve element when the valve element abuts the valve seat;

(f) fluid pressure sensing means responsive to fluid pressure in the fluid flow path for urging the valve element along the transverse axis, in opposition to the action of the second biasing means, to further restrict the orifice in response to the magnitude of the fluid pressure when the valve element abuts the valve seat; and (g) fluid distribution means for minimizing fluid pressure differential on the valve element when the valve element is biased into abutment with the valve seat.

10. The control valve of claim 9 wherein the fluid distribution means comprises a plurality of fluid carrying grooves disposed in one of the valve seat and the valve element communicable with the fluid flow path.

11. The valve of claim 9 wherein one of the valve seat and the valve element is provided with an anti-friction coating to reduce the friction between the valve seat and valve element.

12. The valve of claim 11 wherein said anti-friction coating is polytetrafluoroethylene.

13. A fluid power system comprising:

(a) an actuator responsive to fluid pressure for acting on a load;

(b) a source of fluid under pressure;

(c) conduit means communicating the fluid pressure source and the actuator;

(d) a control valve, disposed in said conduit means intermediate the fluid pressure source and the actuator, comprising:

(i) a housing structure having spaced fluid ports and defining a fluid flow path between the ports;

(ii) the housing structure including a valve seat disposed between the ports, the seat including surfaces defining an orifice along the path;

(iii) a movable valve element positioned adjacent to and abuttable with the valve seat, the valve element being mounted for movement between a first position wherein the orifice is most restricted and a second position wherein the orifice is least restricted;

(iv) biasing means urging the valve element toward the second position;

(v) sensing means responsive to fluid pressure for urging the valve element toward the first position, in opposition to the action of the biasing means, to restrict the orifice in response to such fluid pressure;

(vi) fluid distribution means coactible with the valve element for minimizing fluid pressure differential on the valve element when pressure along the path on the valve seat side of the element is less than pressure along the path on the other side of the element.

14. The fluid power system of claim 13 wherein the control valve's fluid distribution means comprises a plurality of fluid carrying grooves disposed in at least one of the valve seat and the valve element, the grooves being communicable with fluid flow path.

15. The fluid power system of claim 14 wherein the control valve further includes a muffler disposed along the fluid flow path for muffling noise generated by pressurized fluid flowing along the path.

16. The fluid power system of claim 13 wherein at least one of the valve seat and the valve element is provided with an anti-friction coating to reduce the friction between the valve seat and element.

17. In a hydraulic power control valve having a housing structure and at least one input port and one output port, a muffler for muffling noise generated by pressurized fluid flowing through the valve, the muffler comprising a plurality of stamped perforate sheets, the apertures of each sheet being randomly oriented with respect to the apertures of each of the adjacent perforate sheets, each of the perforate sheets being spaced from each adjacent sheet by an annular spacer disposed intermediate each adjacent pair of the perforate sheets, said perforate sheets and annular spacers being positioned in the bore of one of said ports and captured between an annular shoulder formed therein sand a port nipple threadedly engaged in said valve housing structure.

18. A fluid valve for controlling the rate of flow from a hydraulic actuator under load to a reservoir comprising:

(a) a housing structure defining a flow path extending from a first port adapted to be connected to the actuator to a second port adapted to be connected to a reservoir;

(b) said housing structure including an element defining an orifice;

(c) a valve element in flow-controlling relatively movable relationship with the orifice element;

(d) said elements together defining a fluid opening along said path, the opening being of a size which varies on relative movement of the elements;

(e) pressure-responsive means connected to a selected element and adapted to sense pressure generated by a force applied to the connected actuator and to relatively move the elements in response to sensed pressure to modify the size of said opening in relation to the magnitude of the sensed pressure;

(f) at least one of the elements including structure establishing fluid communication between the orifice elements whereby to counteract fluid pressures applied to the valve element.

19. A hydraulic power valve comprising:

(a) a housing structure defining a flow path extending from a first port adapted to be connected to an actuator to a second port adapted to be connected to a reservoir;

(b) a flow control mechanism carried by the housing and positioned between the ports to control the flow of fluid therebetween;

(c) a second-muffling device along said path and interposed between the ports, said sound muffling device comprising a plurality of substantially identical stamped aperture discs, each disc having a plurality of apertures arranged in a predetermined geometric relationship;

(d) a plurality of spacer rings each interposed between an adjacent pair of aperture discs to maintain the discs in predetermined spaced relationship;

(e) said spacer rings and aperture discs being fixedly positioned and captured in the bore of one of said ports between an annular shoulder formed therein and a port nipple threadedly engaged by the housing structure;

(f) each aperture of each disc being oriented in an offset-nonaligned relationship with the corresponding aperture of each adjacent disc so that substantially all fluid flow along through the muffling device is along serpentine paths.

20. A hydraulic power control valve, comprising:

(a) a housing structure having spaced fluid ports and defining a fluid flow path between the ports;

(b) the housing structure including a valve seat disposed along the path between the ports, the seat defining an orifice forming a portion of the path;

(c) a movable valve element disposed within the housing adjacent to and abuttable with the valve seat, the valve element being mounted for movement between a first position wherein the orifice is most restricted and a second position wherein the orifice is least restricted; (d) biasing means urging the valve element toward the second position;

(e) sensing means responsive to fluid pressure for urging the valve element toward the first position, in opposition to the action of the biasing means, to restrict the orifice in response to the fluid pressure;

(f) a muffler disposed along the fluid flow path and near the valve seat for muffling noise generated by pressurized fluid flowing along the path, the muffler comprising a plurality of stamped perforate sheets, the apertures of each sheet being randomly oriented with respect to the apertures of each of the adjacent perforate sheets, each of the perforate sheets being spaced from each adjacent sheet by an annular spacer disposed intermediate each adjacent pair of the perforate sheets, said perforate sheets and annular spacers being positioned in a bore of one of said ports and captured between an annular shoulder formed therein and a port nipple threadedly engaged in said valve housing structure.

* * * * *